(12) United States Patent
Chen

(10) Patent No.: US 6,517,166 B1
(45) Date of Patent: Feb. 11, 2003

(54) LIGHT-REFLECTIVE WHEEL RIM

(75) Inventor: Jeff Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/071,941

(22) Filed: Feb. 7, 2002

(51) Int. Cl.⁷ .......................... B60B 21/00; G02B 5/12
(52) U.S. Cl. .......................... 301/37.108; 301/37.24; 301/37.11; 301/95.102; 359/541; 359/546; 359/548; 359/524; 427/163.4; 427/214; 428/203
(58) Field of Search .......................... 301/37.101, 37.24, 301/37.23, 37.11, 37.108, 37.109, 37.43, 95.101, 95.102; 359/536, 538, 546, 548, 541, 542, 524; 362/473, 500; 427/163.4, 212, 214; 428/203, 204

(56) References Cited

U.S. PATENT DOCUMENTS

| | | | |
|---|---|---|---|
| 3,172,942 A | * | 3/1965 | Berg |
| 3,382,908 A | * | 5/1968 | Palmquist et al. |
| 3,496,006 A | * | 2/1970 | Rideout et al. |
| 4,943,139 A | * | 7/1990 | Bacon, Jr. et al. |
| 5,008,142 A | * | 4/1991 | Wilson et al. ............... 428/203 |
| 5,105,308 A | * | 4/1992 | Holley et al. ............ 359/524 X |
| 5,674,605 A | * | 10/1997 | Marecki .................. 359/536 X |
| 5,882,771 A | * | 3/1999 | Klein et al. .............. 359/541 X |
| 5,988,822 A | * | 11/1999 | Abe et al. .................... 359/541 |
| 6,059,377 A | * | 5/2000 | Wu ........................ 301/95.101 |
| 6,071,604 A | | 6/2000 | Chen et al. .................. 428/323 |

* cited by examiner

Primary Examiner—Russell D. Stormer
(74) Attorney, Agent, or Firm—Harness, Dickey & Pierce, P.L.C.

(57) ABSTRACT

A wheel rim includes a transparent adhesive layer provided on the surface of the wheel rim, a light-reflective particle layer which is substantially free of any superimposed or overlapping particles and which is formed by spreading solely and uniformly dry light-reflective particles on the transparent adhesive layer and contacting directly the particles with the transparent adhesive layer, the particles having dimensions larger than the thickness of the transparent adhesive layer so that some of the dry light-reflective particles which do not contact the transparent adhesive layer can be allowed to fall off the transparent adhesive layer by gravity, and a transparent protective layer provided on the light-reflective particle layer.

4 Claims, 2 Drawing Sheets

LIGHT-REFLECTIVE WHEEL RIM

BACKGROUND OF THE INVENTION

1. Field of the Invention

The invention relates to a light-reflective wheel rim, more particularly to a light-reflective wheel rim having a surface provided with a high light-reflective coating.

2. Description of the Related Art

A light-reflective plate or an adhesive light-reflective paper is usually attached to a wheel rim to result in light-reflective and signaling effects for enhancing driver safety. Since the light-reflective plate or the light-reflective paper is usually provided on certain areas of the wheel rim, the light reflecting effect is affected by the angle of the incident light and by the point of view, and is thus limited and unsatisfactory. Moreover, the adhesive light-reflective paper tends to shrink, to curl up and to be easily stripped from the surface of the wheel rim due to weather and temperature factors. Aging of the light-reflective plate might reduce the light-reflecting effect achieved thereby and may result in cracking of the same.

In view of the aforementioned problems, a process for forming a light-reflective coating on a wheel rim has been proposed. The process comprises the steps of cleaning the surface of the wheel rim, providing a glossy surface on the cleaned surface by polishing the cleaned surface or by providing a coating on the unpolished cleaned surface, preparing a sprayable light-reflective paint by mixing light-reflective particles with a paint, spraying the light-reflective paint on the glossy surface of the wheel rim, forming a protective layer on the light-reflective paint, attaching a label to the protective layer, and applying a finishing layer on the label and the protective layer.

Accordingly, when light strikes the surface of the wheel rim having the light-reflective coating prepared from the aforementioned process, the light can be reflected by the light-reflective particles.

However, the aforementioned prior art has the following drawbacks:

Since the light-reflective particles are mixed with the paint to form the light-reflective paint, the light-reflective layer can include areas in which the particles are stacked or superimposed and areas in which the light-reflective particles are sparse. When light strikes an area having superimposed particles, reflection is poor because light is dispersed due to the different reflection angles of adjacent particles. When light strikes an area with sparse light-reflective particles, reflection is ineffective. Therefore, the aforementioned process is not satisfactory.

SUMMARY OF THE INVENTION

Therefore, the object of the present invention is to provide a light-reflective wheel rim having a surface provided with a high light-reflective coating, by which the reflection effects of light-reflective particles do not interfere with one another.

The wheel rim according to this invention has a surface provided with a high light-reflective coating, which includes a transparent adhesive layer provided on the surface of the wheel rim; a light-reflective particle layer which is substantially free of any superimposed or overlapping particles, and which is formed by spreading solely and uniformly dry light-reflective particles on the transparent adhesive layer and contacting directly the particles with the transparent adhesive layer, the particles having dimensions larger than the thickness of the transparent adhesive layer so that some of the dry light-reflective particles which do not contact the transparent adhesive layer can be allowed to fall off the transparent adhesive layer by gravity; and a transparent protective layer provided on the light-reflective particle layer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
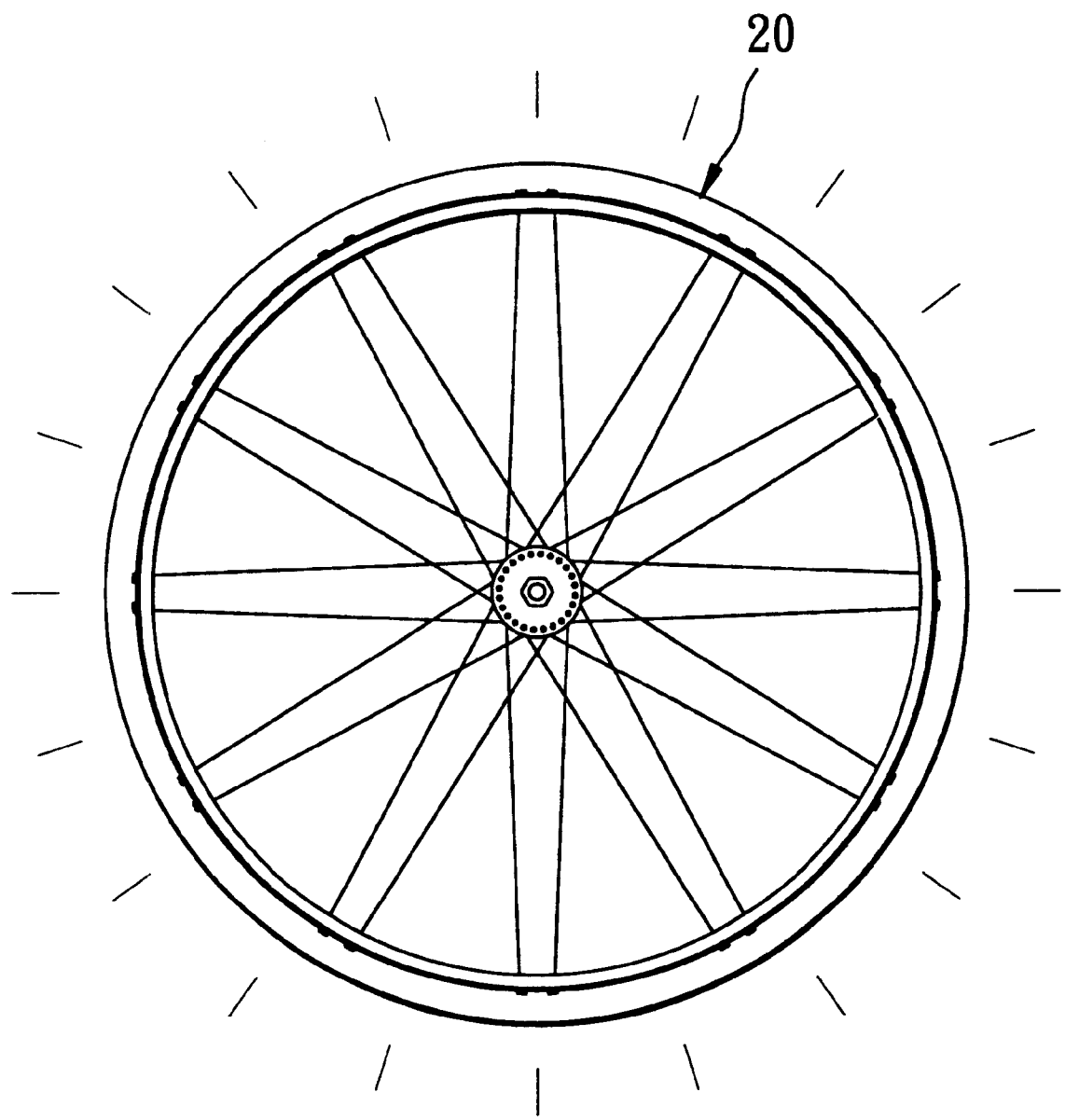
FIG. 1 is a schematic view of a bicycle wheel including the preferred embodiment of a light-reflective wheel rim according to this invention.
Figure 2:
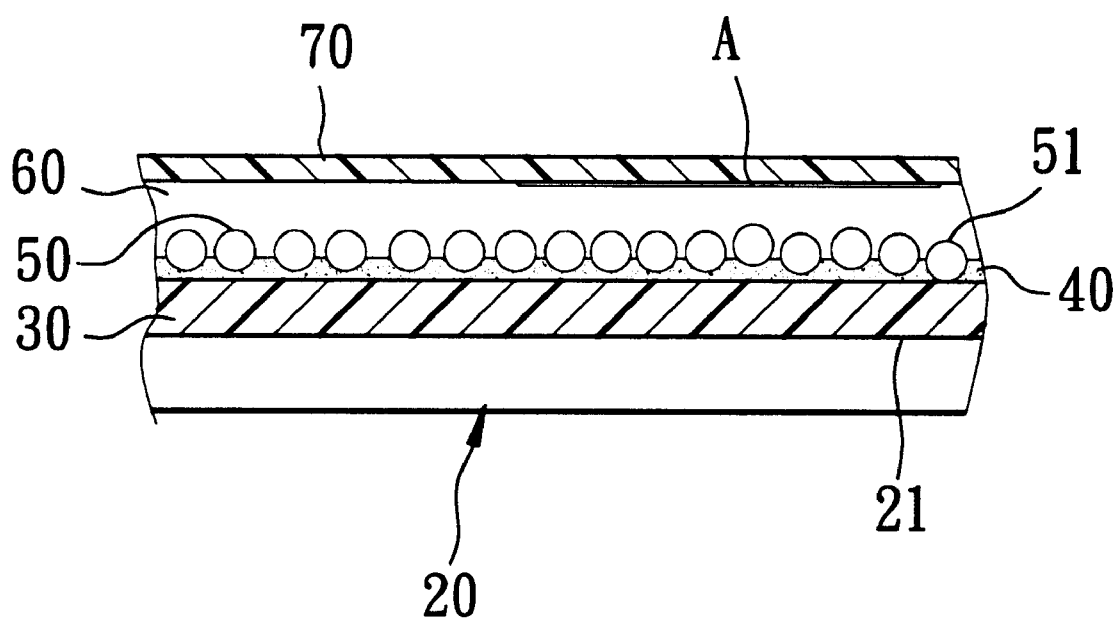
FIG. 2 is a fragmentary sectional view of FIG. 1.

Referring to FIGS. 1 and 2, the preferred embodiment of the wheel rim 20 according to this invention has a surface provided with a high light-reflective coating, which includes a glossy surface 30, a transparent adhesive layer 40, a light-reflective particle layer 50, a transparent protective layer 60, and a transparent finishing layer 70.

The glossy surface 30 is formed on the surface 21 of the wheel rim 20. In case the wheel rim 20 is made of aluminum, the surface 21 of the wheel rim 20 is polished directly to result in the glossy surface 30. In case the wheel rim 20 is made of iron, a silver coating is formed on the surface 21 of the wheel rim 20 to result in the glossy surface 30.

The transparent adhesive layer 40 is applied on the glossy surface 30 of the wheel rim 20. Preferably, the transparent adhesive layer 40 is an epoxy resin having a viscosity of 10"–12", measured by IWATA NK-2 viscosity meter made in Japan.

The light-reflective particle layer 50 is substantially free of any superimposed or overlapping particles, and is formed by spreading solely and uniformly dry light-reflective particles 51 on the transparent adhesive layer 40 and contacting directly the particles with the transparent adhesive layer 40 and allowing some of the dry light-reflective particles 51 which do not contact the transparent adhesive layer 40 to fall off the transparent adhesive layer 40 by gravity. The light-reflective particles 51 are in the form of dry powder with a high density, a high reflective index, and a smooth surface. The light-reflective particles 51 provide excellent reflectivity that cannot be achieved by pearl and silver particles.

The protective layer 60 is a colored or colorless transparent layer applied on the light-reflective particle layer 50 for protecting the latter. Preferably, a label (A) can be attached to the protective layer 60. The finishing layer 70 is a transparent layer applied over the label (A) and the protective layer 60, and serves to protect the label (A).

The transparent adhesive layer 40 has a suitable viscosity, and the dimension of the light-reflective particles 51 are larger than the thickness of the transparent adhesive layer 40 so as to permit adhering of the light-reflective particles 51 thereon and so as to prevent the light-reflective particles 51 from sinking fully into the transparent adhesive layer 40. Since the transparent adhesive layer 40 is applied on the glossy surface 30 of the wheel rim 20 in advance, rather than being mixed with the light-reflective particles 51, the light-reflective particles 51 can be attached directly on the transparent adhesive layer 40 in a dry adhesive manner.

Moreover, since the light-reflective particles 51 have high densities and smooth surfaces, when the light-reflective particles 51 are adhered on the transparent adhesive layer 40 to cover the same, excess particles 51 cannot attach to the light-reflective particle layer 50, and will drop therefrom by virtue of gravity. As such, the light-reflective particle layer 50 is substantially free of any superimposed or overlapping particles. A collecting pan (not shown) may be provided below the wheel rim 20 during the reflection treatment for collecting excess light-reflective particles 51 for recycling.

When light is incident upon the light-reflective wheel rim 20 according to the present invention, a relatively uniform and bright reflected light can be generated to provide an enhanced signaling effect as compared to a conventional wheel rim having a light-reflective coating formed from the aforementioned process of the prior art.

The light-reflective bicycle wheel of this invention has the following advantages:

1) The light-reflective coating provides excellent reflectivity since the light-reflective particles 51 can be distributed uniformly on the entire surface of the wheel rim 20 and since the light-reflective particle layer 50 is substantially free of any superimposed or overlapping particles.

2) Since excess light-reflective particles 51 do not attach to the light-reflective particle layer 50 and can be collected for reuse, the light-reflective particles 51 can be used efficiently to result in cost savings.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A light-reflective wheel rim having a surface provided with a high light-reflective coating, wherein said coating includes:

a transparent adhesive layer provided on the surface of said wheel rim;

a light-reflective particle layer which is substantially free of any superimposed or overlapping particles, and which is formed by spreading solely and uniformly dry light-reflective particles on said transparent adhesive layer and contacting directly the particles with said transparent adhesive layer, the particles having dimensions larger than the thickness of the transparent adhesive layer so that some of said dry light-reflective particles which do not contact said transparent adhesive layer can be allowed to fall off said transparent adhesive layer by gravity; and a transparent protective layer provided on said light-reflective particle layer.

2. The light-reflective wheel rim as claimed in claim 1, wherein said light-reflective particle layer is free of an area where said light-reflective particles are sparse.

3. The light-reflective wheel rim as claimed in claim 1, wherein said transparent adhesive layer is an epoxy resin layer.

4. The light-reflective wheel rim as claimed in claim 1, wherein said coating further includes a label provided on said protective layer, and a transparent finishing layer provided on said label and said protective layer.

* * * * *